J. W. AND K. S. BRENKERT.
PICTURE PROJECTING MACHINE.
APPLICATION FILED NOV. 21, 1919.

1,427,575.

Patented Aug. 29, 1922.
3 SHEETS—SHEET 1.

Inventors
Joseph W. Brenkert,
Karl S. Brenkert,
By
Attorneys

Inventor
Joseph W. Brenkert,
Karl S. Brenkert,
By
Attorneys

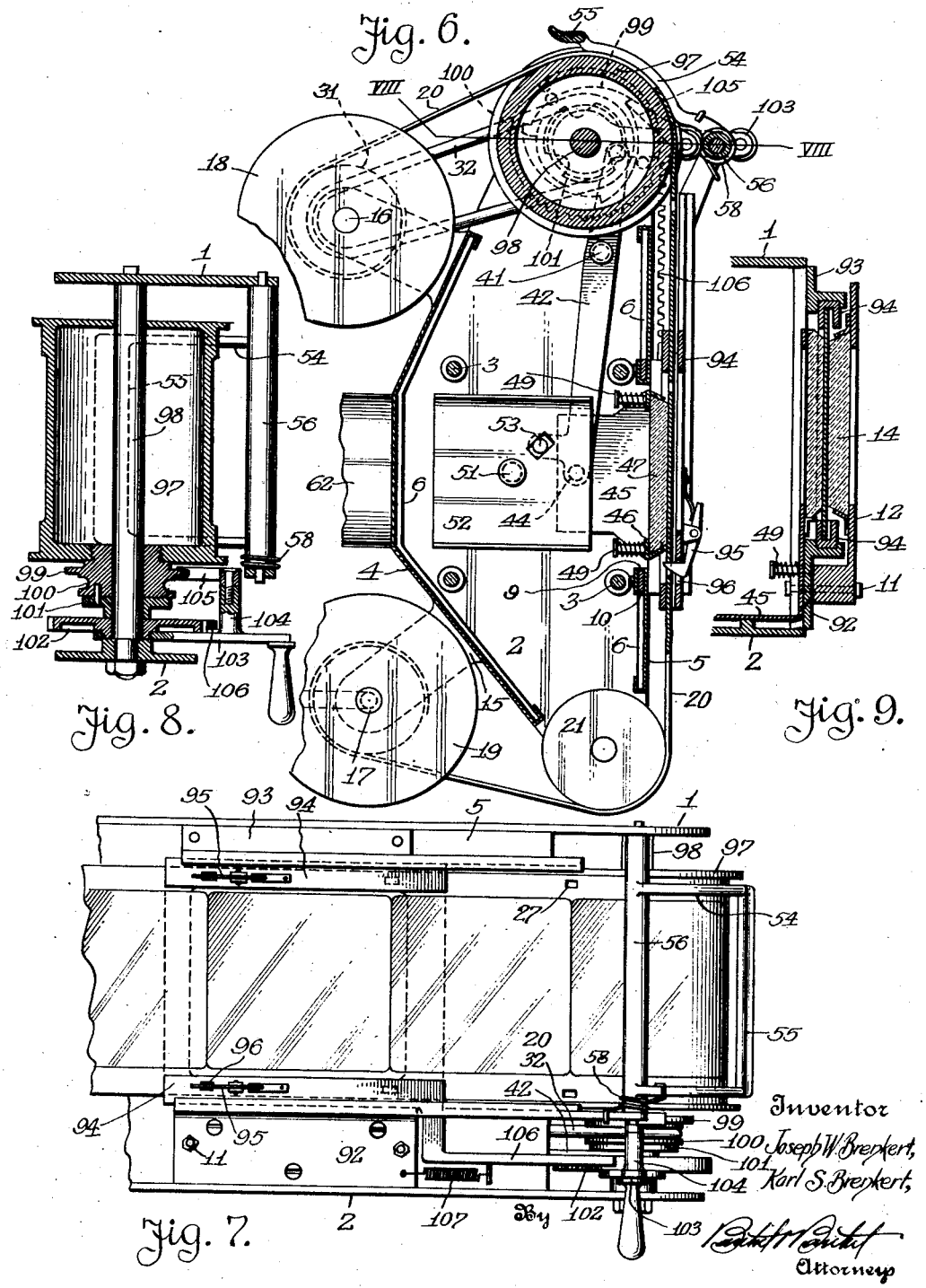

UNITED STATES PATENT OFFICE.

JOSEPH W. BRENKERT AND KARL S. BRENKERT, OF DETROIT, MICHIGAN.

PICTURE-PROJECTING MACHINE.

1,427,575.  Specification of Letters Patent.  Patented Aug. 29, 1922.

Application filed November 21, 1919. Serial No. 339,551.

*To all whom it may concern:*

Be it known that we, JOSEPH W. BRENKERT and KARL S. BRENKERT, citizens of the United States of America, residing at Detroit, in the county of Wayne and State of Michigan, have invented certain new and useful Improvements in Picture-Projecting Machines, of which the following is a specification, reference being had therein to the accompanying drawings.

This invention relates to a picture projecting machine, and has special reference to that type of projecting machines or stereopticon wherein films are placed and intermittently shifted into position to have pictures or negatives thereof projected on to a screen. In this type of machine the film or negatives must necessarily pass in the focus so that rays of light may be projected therethrough to transfer the picture to a screen and since the film is in proximity to the source of light there is always a possibility of the film buckling, contracting or becoming distorted. The holding of a film in a flat condition is essential for a good projection of the picture of the film, and various means have been used to maintain the film flat, both while stationary and while being moved. Thus far the holding means has caused the film to be scratched and marred to such an extent that the pictures appear streaky and devoid of the detail projection so essential in good pictures. By experimenting, we have found that it is practically impossible to maintain a film taut and in a flat condition by a constant holding or guiding means without having the film injured or susceptible to breakage, therefore we believe the ultimate means of holding a film will be a device that will positively clamp the film while stationary and release the film so that it may be moved.

To this end, we have devised a novel film or negative clamping device that will be automatically actuated in timed relation to the intermittent movement of the film or negative and thus permit of the film being clamped in a flat condition when stationary and wholly released when the film is to be shifted. Such mechanism will eliminate any wiping or straining frictional contact with the film and there can be no possibility of the surface of the film being scratched or marred due to the clamping device.

Associated with the film clamping device of the machine is a novel mechanism for intermittently shifting the film and one form of this mechanism may be characterized as of a fixed pin or cog feed type, another as the receding pin or cog feed type, and a further form as the reciprocable dog, rack and pinion type, it being optional with the operator of the projecting machine as to the form desired, and ordered with the machine.

Our invention is further characterized by an oscillatory lever shutter actuating mechanism and a gear actuated shutter mechanism, both of which are articulated with the film clamping device, so that the clamping device and shutter may be actuated in timed relation and thus insure proper cooperation of all of the elements of the machine in projecting a picture.

The organization briefly outlined above includes many other instrumentalities, particularly a novel apertured plate or bracket, that are materially different from picture projecting machines now in use, and these instrumentalities will be hereinafter considered and then claimed.

Reference will now be had to the drawings, wherein

Fig. 6 is a horizontal sectional view of a portion of the machine, illustrating the reciprocatory dog, rack and pinion type of mechanism;

Fig. 7 is a rear elevation of a portion of the same;

Fig. 8 is a vertical cross sectional view taken on the line VIII—VIII of Fig. 6;

Fig. 9 is a vertical longitudinal sectional view of a portion of the same;

In describing our invention by aid of the views above referred to, we desire it to be understood that the same are intended as merely illustrative of the mechanisms which we have constructed and used, and we do not care to confine our invention to the precise construction and arrangement of parts, other than defined by the appended claims.

Figure 1:
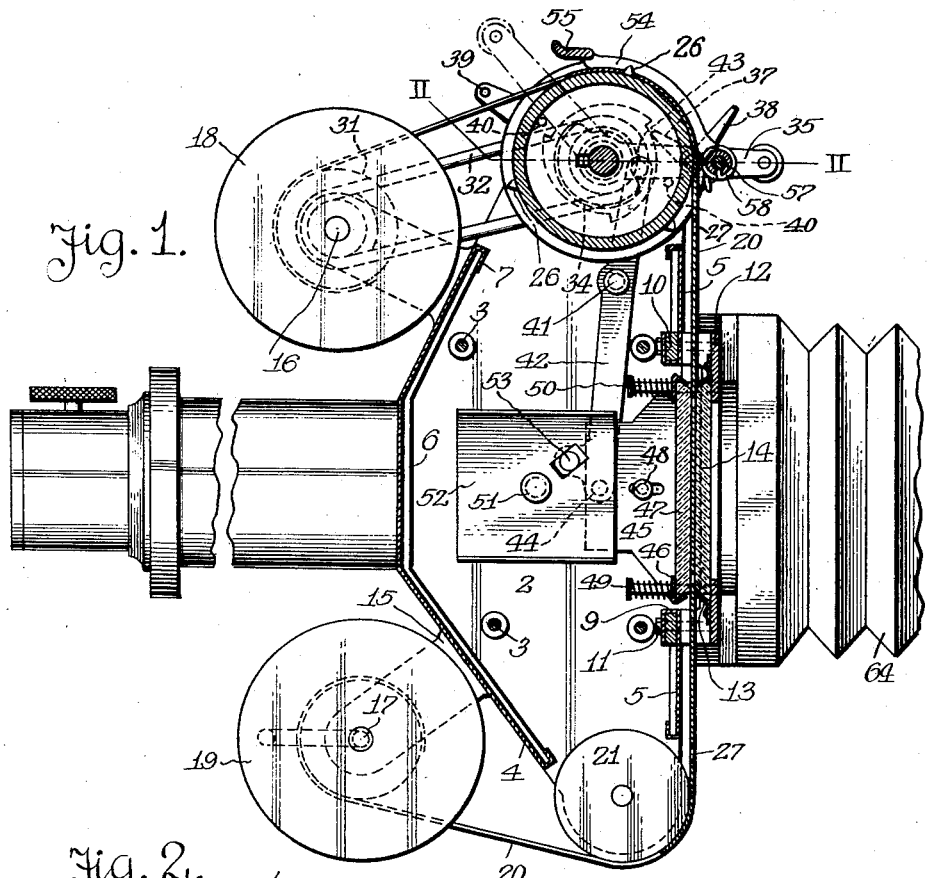
Figure 1 is a horizontal sectional view of a portion of a picture projecting machine, partly in plan, showing a preferred embodiment of my invention.
Figure 2:
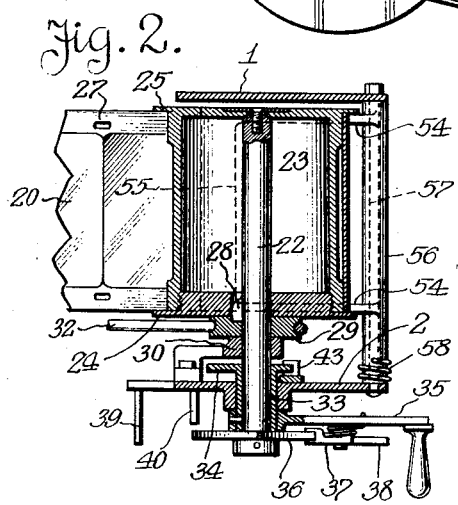
Fig. 2 is a vertical cross sectional view taken on the line II—II of Fig. 1.
Figure 3:
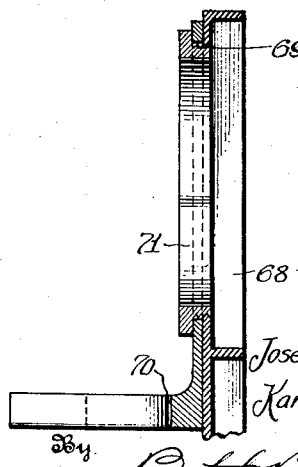
Fig. 3 is a vertical sectional view of an apertured plate and support.

Reference will first be had to Figs. 1 and 2 showing what we have heretofore referred to as a fixed pin or cog feed type of mechanism, the greater part of which is located within a casing that is substantially oblong or polygonal in plan, and comprises top and bottom walls or plates 1 and 2 connected by a plurality of screw bolts 3 and maintained in spaced relation by front and rear walls 4 and 5 respectively. The top and bottom walls 1 and 2, at the front and rear edges thereof have confronting ribs 6 which assist in positioning the front and rear walls 4 and 5, and said walls have the ends thereof bent, as at 7, so as to embrace the ends of the ribs 6 and prevent longitudinal displacement of the front and rear walls. The rear wall 5 has an opening with the vertical edges thereof bent, as at 9, so as to embrace fillers 10. These fillers form a substantial support for screw bolts 11 employed for connecting a spaced stationary apertured plate 12 to the rear wall 5. The apertured plate 12 has a suitable holder 13 for a transparent plate 14, said transparent plate and its holder constituting a stationary clamping device against which a film may be held.

The bottom wall 2, adjacent the ends thereof, has forwardly extending brackets 15 for the rotatable spindles 16 and 17 of spools 18 and 19 respectively, the former being a film take-up spool and the latter a supply or magazine spool for a film 20 that is adapted to be wound on the take-up spool and rewound on the supply or magazine spool 19.

Between the top and bottom plates 1 and 2, at one end of the casing, is a guide roll 21 for the film 20 and at the opposite end of the casing is located the fixed pin or cog feed mechanism comprising a rotary spindle 22 having a hollow roll 23 mounted thereon. The roll 23 is of the built-up type having flange heads 24 and 25, between which the film 20 passes, and adjacent said heads are fixed pins 26 adapted to enter suitable apertures 27 provided therefor in the film 20, so that when the roll 23 is intermittently moved or revolved the film may be shifted by said roll. The roll 23 is keyed or fixed to the spindle 22, as at 28, and the same fastening means retains a grooved sheave 29 in fixed relation to the spindle 22, said sheave resting on bearings 30 connected to the bottom plate 2 of the casing.

Mounted on the spindle 16 of the take-up spool 18 is a sheave 31 which is in a horizontal plane with the sheave 29 so that an endless belt, cable or other power transmission member 32 may be trained about said sheaves and thus have the take-up spool 18 move in unison with the feed roll 23.

Loose on the lower end of the spindle 22 is a hub 33 of a horizontally disposed cam 34 and mounted on the lower end of the cam hub 33 is a crank 35. In consequence of this arrangement the crank 35 is loose relative to the spindle 22 and in order that the crank may impart an intermittent movement to said spindle, the lower end thereof is provided with a fixed ratchet wheel 36 normally engaged by a spring pressed pawl 37, carried by the crank 35. The pawl 37 has an extension or handle 38 adapted to impinge against a stop 39 extending from the bottom wall 2 of the casing, said stop shifting the pawl 37 out of engagement with the ratchet wheel 36 when the crank 35 reaches the extreme position of its counterclockwise movement. It is through the medium of the crank, ratchet wheel and pawl that an intermittent movement may be imparted to the feed roll 23 and the operation of said crank is limited by depending stops 40, carried by the casing wall 2.

Pivotally mounted on the casing wall 2, as at 41, is a lever 42 extending under the feed roll 23 and provided with a stud or roller 43 which normally engages the cam 34. The opposite end of the lever 43 is pivotally connected, as at 44, to the lateral flange 45 of a movable film clamping device, comprising a holder 46 and a transparent plate 47, said movable clamping device being at the opening 8 in the rear casing wall 5 so that it may cooperate with the stationary clamping device in guiding and sandwiching the film 20 therebetween. The lateral flange 45 of the holder 46 is loosely retained and guided on the bottom wall 2 of the casing by a headed stud 48 carried by the wall 2 and extending through a longitudinal slot provided therefor in the flange 45. In addition to the stud 48, the holder is guided by posts 49, carried by the aperture plate 12, said posts being encircled by coiled compression springs 50 which normally maintain the movable clamping device in a closed position and against the film 20 relative to the stationary clamping device. The expansive force of the springs 50 operating through the medium of the holder 46, the flange 45 and the lever 42, maintains the stud or roller 43 of said lever normally in engagement with the cam 34, so that said cam may move the movable clamping device away from the stationary clamping device, and thus release the film 20 for movement by the feed roll 23. It is obvious that when the cam 34 allows the outer end of the lever 42 to recede that the expansive force of the springs 50 will clamp the transparent plate 47 against the film 20 and since said film is backed by the transparent plate 14, the film will be held in a flat and proper position for the projection of the picture carried thereby. When the film is so clamped, it is practically impossible for heat to buckle or distort the exposed portion of the film.

Pivotally mounted on the casing bottom wall 2, as at 51, is a bi-plane shutter 52 which is slotted to receive a stud 53 of the lever 42, and in consequence of this articulation of the shutter lever and movable clamping device it is possible for the oscillatory movement of the lever 42 to open and close the shutter 52 and cause the movable clamping device to be operated in timed relation to the movement of the shutter and the movement of the film 20.

Figure 5:
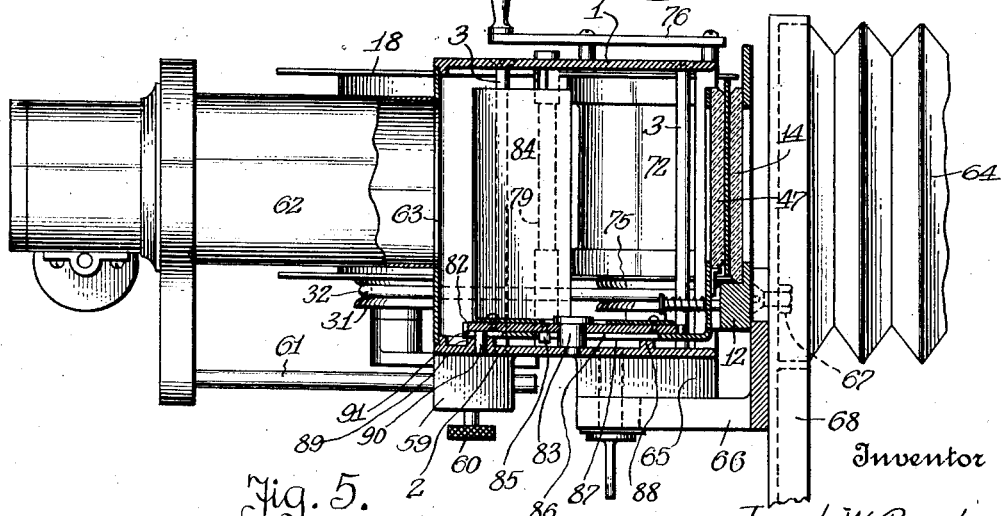
Fig. 5 is a longitudinal sectional view of the same.

Adjacent the feed roll 23 is a tension device for maintaining the film 20 in engagement with the feed roll, said device comprising a set of arms 54 having the outer ends thereof connected by a finger piece 55, and the inner ends thereof connected by a sleeve 56 pivotally or loosely mounted on a pin or tie rod 57 connecting the top and bottom walls 1 and 2 of the casing. The arms 54 are curved to conform to the periphery of the feed roll 23 and said arms engage the upper and lower edges of the film 20, between the openings or apertures 27 and the flange heads 24 and 25 of the feed roll, thus preventing the film 20 from becoming accidentally displaced relative to said feed roll, particularly during the shifting of said film. The arms 54 of the tension device are frictionally held in engagement with the film by a coiled spring 58 at the lower end of the sleeve 56, said spring having one convolution thereof connected to the casing wall 2 and the opposite end thereof connected to the sleeve 56. This spring however does not interfere with an outward movement of the arms 54 which is essential when placing the film in engagement with the roll 23 to be fed thereby from the supply or magazine spool 19 to the take-up spool 18. As shown in Fig. 5 the bottom of the casing wall 2 has a set of lugs 59 provided with set screws 60 for adjustably holding the rearwardly extending rod 61 of a projector 62, said projector registering with an opening 63 in the front wall 4 of the casing. The projector 62 is of the ordinary and well known type which is mounted in alinement with the oscillatory shutter 52, the film clamping device, the aperture plate 12 and the bellows extension 64 of a lamp house or conventional form of stereopticon (not shown).

The film casing is supported relative to the bellows extension 64 by a set of lugs 65 on the wall 2 of the casing resting on the brackets 66 suitably connected, as at 67, to the front frame 68 of the bellows extension 64. The lugs 65 are provided with winged thumb screws 69 which engage the brackets 66 and positively hold the film casing and its appurtenant parts relative to the front frame 68 of the stereopticon.

The front frame 68 of a stereopticon ordinarily has an interiorly screwthreaded opening 69, and instead of connecting the brackets 66 to the frame 68 by such fastening means indicated 67 and shown in Fig. 5, we provide a bracket 70 with a clamping ring 71 that may be screwed into the opening 69 of the frame 68 to retain the bracket 70 in engagement therewith, said ring fitting between the frame 68 and the aperture plate 12, either form of brackets of our film casing being easily and quickly installed in connection with an ordinary form of stereopticon.

Figure 4:
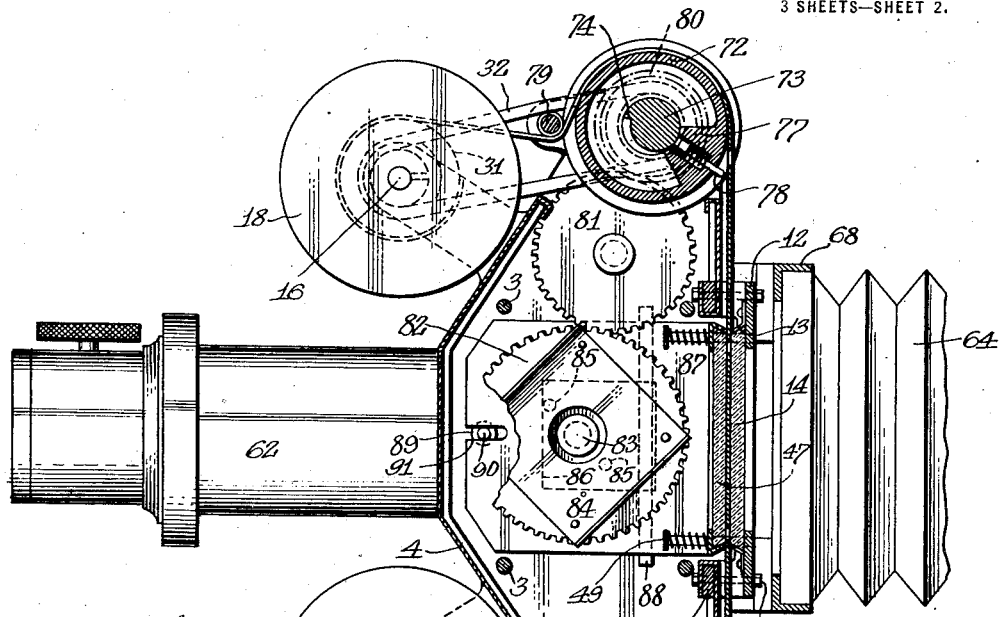
Fig. 4 is a view similar to Fig. 1, illustrating a receding pin or cog feed type of mechanism associated with the gear actuated shutter.

Reference will now be had to Figs. 4 and 5 showing what we consider a receding pin or cog feeding mechanism. In this mechanism the feed roll is designated 72 and is rotatable about a stationary spindle 73 having a cam portion 74. The lower end of the feed roll 72 has a sheave 75 so that the take-up spool may have movement imparted thereto, as in the preferred form of construction and the upper end of the spool 72 has a fixed crank 76 by which the feed roll may be conveniently revolved about the stationary spindle 73.

In the feed roll 72 is an enlargement 77 containing a spring retracted pin 78 that is normally held in engagement with the spindle 73 by the expansive force of the spring within the enlargement 77. The pin 78 normally protrudes from the periphery of the feed roll 72 and with one of these pins at each end of the feed roll, said pins may engage in the openings or apertures 27 of the film 20 and shift the film during a partial rotation of the feed roll 72. The cam portion 74 of the stationary spindle 73 allows the pin 78 to recede, at a predetermined point during the rotation of said feed roll, so that during a portion of the rotation of said feed roll, the film 20 may remain stationary, and it is during such period that the picture of the film is projected on a screen. The feed roll, through the medium of its receding pin, affords an intermittent movement for the film and the feed roll and its receding pin are proportioned relative to the location of the openings or apertures 27 in the film 20 so that after each movement of the film a picture will be properly presented for projection purposes, between the stationary and movable film clamping devices and in alinement with the projector 62.

To maintain the film 20 against the feed roll 72, a tension or guide roller 79 is located between the feed roll 72 and the take-up spool 18, said tension roller serving practically the same purpose as the tension device shown in Fig. 1.

Associated with this receding pin or cog feed type of mechanism is a gear actuated shutter mechanism comprising a train of horizontally disposed gear wheels 80, 81 and 82. The gear wheel 80 is movable with the feed roll 72 and supported therefrom beneath the sheave 75, and the gear wheel 81 is rotatably mounted on the wall 2 of the casing, while the gear wheel 82 is rotatable about a stud 83 on the wall 2.

Suitably mounted on the gear wheel 82 is a bi-plane shutter 84 and said gear wheel has depending pins 85 extending into a rectangular opening 86 in the lateral flange 87 of a movable film clamping device, which other than the flange 87 is similar to the preferred form of movable clamping device shown in Fig. 1. The flange 87 is supported on a transverse rib 88 and a boss 89 of the casing wall 2, said boss having a pin or stud 90 extending into a slot 91 provided therefor in the flange 87.

In this form of our invention, the train of gear wheels are so proportioned, that the shutter 84 permits of the film picture being projected when the film is stationary and while the film is being shifted the shutter serves as a partition between the projector 62 and the film. It is during the shifting of the film by the feed roll 72 that the depending pins or studs 85 of the gear wheel 82 engage walls of the opening 86 and hold the movable clamping device in a retracted position, thus preventing the film from being scratched or injured by contacting with the stationary and movable clamping devices.

Reference will now be had to Figs. 6 to 9 inclusive showing the reciprocable dog, rack and pinion type of mechanism. Suitably secured to the rear wall 5 of the casing are longitudinally disposed guide members 92 and 93 and slidable in said guide members is a frame 94 through which the film 20 extends and is adapted to be moved in synchronism therewith. On the upper and lower edges of said frame are spring pressed pivoted dogs 95 and these dogs are adapted to protrude through openings 96 in the frame 94 and engage in the openings or apertures 27 of the film, so that when the frame 94 is advanced the film will be carried thereby. When the frame 94 recedes or is restored to normal position, the dogs 95 ride out of engagement with the film and obtain a fresh grip thereon for the next movement of said film.

At one end of the casing is a feed roll 97 rotatable about a spindle 98 and suitably fixed relative to the lower end or head of the feed roll 97 is a ratchet wheel 99, a sheave 100, and a cam 101. Loose on the spindle 98, below the cam 101, is a mutilated gear wheel or segment gear 102 having a crank 103 and said crank is provided with a post 104 supporting a spring pressed pawl 105 which normally engages the ratchet wheel 99. The gear wheel 102 meshes with a rack 106, carried by the lower end of the film frame 94 and said rack is connected to the guide member 92 by a coiled retractile spring 107; the rack 106 advancing the film frame and the spring 107 retracting the same when the rack 106 is released by the gear wheel 102.

A film tension device and an oscillatory shutter lever are associated with the feed roll 97 and the cam 101, as in the preferred form of construction, and by reference to Fig. 9, it will be noted that the movable and stationary film clamping devices extend into the film 94 to clamp the film therein when said film is stationary. The frame 94 provides clearance for the stationary clamping device and the movable clamping device is retracted during the reciprocable movement of the film frame 94.

Comparing the preferred form of construction shown in Figs. 1 and 2 with the modifications shown in Figs. 6 to 9 inclusive it will be noted that in the preferred form of construction that the cam 34 is fixed relative to the crank 35 and independent of the feed roll 23, consequently said cam need only have one rise or depression so that the shutter lever 42 will be oscillated. In the modification shown in Figs. 6 and 8, the cam 101 is fixed for rotation with the feed roll 97 and in consequence of this arrangement the cam must have a plurality of rises or depressions so that the shutter lever 42 will be oscillated each time the film frame is advanced. It is apparent however, that with a slight modification in the construction the cam arrangement shown in Fig. 1, may be associated with the feed roll shown in Figs. 6 and 8.

What we claim is:—

1. In a film picture projecting machine, a casing, a cog feed mechanism at one end of said casing for shifting the film, comprising a rotary spindle, a film engaging roll thereon, a spring pressed cam-engaged pin in said roll for intermittently engaging the film, means for rotating said spindle, and causing the pin to engage and feed the film, a shutter in said casing, and means in said casing extending under said film engaging roll adapted to move said shutter in timed relation to the movement of the film.

2. A film picture projecting machine as in claim 1, wherein said shutter has the configuration of a bi-plane, and said means includes a train of gears for moving said shutter.

In testimony whereof we affix our signatures in presence of two witnesses.

JOSEPH W. BRENKERT.
KARL BRENKERT.

Witnesses:
ANNA M. DORR,
KARL H. BUTLER.